(12) United States Patent
Bank et al.

(10) Patent No.: US 10,095,664 B2
(45) Date of Patent: Oct. 9, 2018

(54) PRESENTATION OF CONTENT IN A WINDOW OF TIME

(71) Applicant: International Business Machines Corporation, Armonk, NY (US)

(72) Inventors: Judith H. Bank, Cary, NC (US); Liam Harpur, Dublin (IE); Ruthie D. Lyle, Durham, NC (US); Patrick J. O'Sullivan, Dublin (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 14/310,406

(22) Filed: Jun. 20, 2014

(65) Prior Publication Data
US 2015/0370758 A1    Dec. 24, 2015

(51) Int. Cl.
G06F 17/21    (2006.01)
G06F 17/30    (2006.01)
G06Q 10/10    (2012.01)

(52) U.S. Cl.
CPC ......... *G06F 17/212* (2013.01); *G06Q 10/109* (2013.01)

(58) Field of Classification Search
CPC ......... G06F 17/21; G06F 17/30; G06F 17/212
USPC ...................................................... 715/229
See application file for complete search history.

(56) References Cited

U.S. PATENT DOCUMENTS

| | | |
|---|---|---|
| 7,644,427 B1 | 1/2010 | Horvitz et al. |
| 2005/0267770 A1 | 12/2005 | Banavar et al. |
| 2009/0158342 A1 | 6/2009 | Mercer et al. |
| 2010/0082376 A1 | 4/2010 | Levitt |

OTHER PUBLICATIONS

Divakaran, A. et al., "Blind Summarization: Content-Adaptive Video Summarization using Time-Series Analysis", SPIE Conference on Multimedia Content Analysis, Management, and Retrieval, Jan. 2006, SPIE vol. 6073, pp. 6-10, TR2006-026, Copyright © Mitsubishi Electric Research Laboratories, Inc., 2006.

Gonçalves et al., "Professional and User-Generated Content Rating using Context Information", Network & Electronic Media (NEM) Summit, 2010.

He et al., "Cascaded Regression Analysis Based Temporal Multi-document Summarization", Informatica 34 (2010) 119-124, Copyright 2010 Slovenian Society Informatika.

(Continued)

*Primary Examiner* — Andrea Leggett
(74) *Attorney, Agent, or Firm* — Robert J. Shatto (57) ABSTRACT

A method, for presenting a content item from a plurality of content items for a window of time, includes receiving the window of time and a user profile. The method also includes identifying a content preference and a presentation preference within the user profile. The method also includes selecting the plurality of content items based on the content preference. The method also includes prioritizing the plurality of content items, based on the presentation preference, that results in a plurality of prioritized content items. The method also includes determining a presentation option, for the plurality of prioritized content items, having a presented content item. The method also includes presenting the presented content item corresponding to the presentation option.

17 Claims, 6 Drawing Sheets

(56) References Cited

OTHER PUBLICATIONS

Jatowt et al., "Summarization of Dynamic Content in Web Collections", PKDD '04 Proceedings of the 8th European Conference on Principles and Practice of Knowledge Discovery in Databases, Springer-Verlag New York, Inc., New York, NY, USA © 2004.
Liu et al., "Time Oriented Video Summarization", Image Analysis and Recognition, Second International Conference, ICIAR 2005, LNCS 3656, pp. 99-106, 2005, M. Kamel and A. Campiho (Eds.), © Springer-Verlag Berlin Heidelberg 2005.
Unknown, "Interactive, Real-time Document Summarization", http://www.surfwax.com/technology/summary.htm.

PRESENTATION OF CONTENT IN A WINDOW OF TIME

BACKGROUND

The present disclosure relates to content selection, and more specifically, to content selection within a window of time.

Events may be scheduled within a window of time. The events can include viewing content. Calendar applications may use blocks of time that are planned by a user. The user may direct a calendar application to schedule the block of time to accomplish a task. If the user finishes the task before the end of the block of time, then the user can use the extra time in a manner that may be inefficient.

SUMMARY

Embodiments of the present disclosure may relate to presenting a content item from a plurality of content items for a window of time.

One embodiment is directed toward a method for presenting a content item from a plurality of content items for a window of time. The method includes receiving the window of time and a user profile. The method also includes identifying a content preference and a presentation preference within the user profile. The method also includes selecting the plurality of content items based on the content preference. The method also includes prioritizing the plurality of content items, based on the presentation preference, that results in a plurality of prioritized content items. The method also includes determining a presentation option, for the plurality of prioritized content items, having a presented content item. The method also includes presenting the presented content item corresponding to the presentation option.

Another embodiment is directed toward a system for use with a computer that is configured to host a viewing application that allows a plurality of content items to be presented to a user. The system can include one or more computer processor circuits that are configured to host a sharing analysis application. The sharing analysis application can be configured to receive a window of time and a user profile corresponding to the user. The sharing analysis application can also identify a content preference and a presentation preference within the user profile. The sharing analysis application can also select the plurality of content items based on the content preference. The sharing analysis application can also prioritize the plurality of content items, based on the presentation preference, that results in a plurality of prioritized content items. The sharing analysis application can also determine a presentation option, for the plurality of prioritized content items, having a presented content item. The sharing analysis application can also present the presented content item corresponding to the presentation option to the user.

Another embodiment is directed toward a computer program product for selecting a content item from a plurality of content items to fit within a window of time. The computer program product includes a computer readable storage device having a computer readable program stored therein, wherein the computer readable program, when executed on a computing device, causes the computing device to receive the window of time and a user profile. The computer readable program also causes the computing device to identify a content preference and a presentation preference within the user profile. The computer readable program also causes the computing device to select the plurality of content items based on the content preference. The computer readable program also causes the computing device to prioritize the plurality of content items, based on the presentation preference, that result in a plurality of prioritized content items. The computer readable program also causes the computing device to determine a presentation option, for the plurality of prioritized content items, having a presented content item. The computer readable program also causes the computing device to present the presented content item corresponding to the presentation option.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to content selection, and more specifically, to content selection within a window of time. For instance, aspects of the present disclosure can relate to a content selection application that is associated with a viewing application. The content selection application can receive various preferences, including content preferences, and presentation preferences. The content selection application can also receive a window of time. The content selection application can retrieve content according to the content preferences. One or more presentation options can be prepared by the content selection application that have one or more content items that fit within the window of time. The presentation option can be selected based on presentation preferences. While the present disclosure is not necessarily limited to such applications, various aspects of the disclosure may be appreciated through a discussion of various examples using this context.

Situations oftentimes arise when a user has 10-15 minutes to spare (i.e., a window of time), that is owed to a meeting that finished early, or a short free slot in the work day. Likewise, situations arise where the user has a proliferation of content repositories (i.e., content sources) that are accessed, e.g., corporate e-mail, wikis, blogs, communities, or social networking websites.

In situations where users have spare time, a viewing application of the content source may have difficulty in ascertaining how best to use the spare time, in terms of identifying which collaborative or social data to prioritize for the spare time. Aspects of the present disclosure may relate to providing the capability to recommend how to utilize the spare time using the different content sources.

In various embodiments of the present disclosure, a user can select a time window/window of time (e.g., 10 minutes, 20 minutes, one hour, etc.) and ask the content selection application for help in identifying the social or collaborative content that that can fit to this time window. The user may have content preferences that allow the user to select from content that is unique to the user's personal interests, business interests, or other interests in varying levels of granularity. For example, a user who has 10 minutes to spare can request from the content selection application to provide the latest content on a Customer Relationship Management (CRM) Opportunity including recent/relevant emails, Instant Messaging conversations, activities, etc. The content may be further prioritized/reduced to fit the desired window of time.

Figure 1:
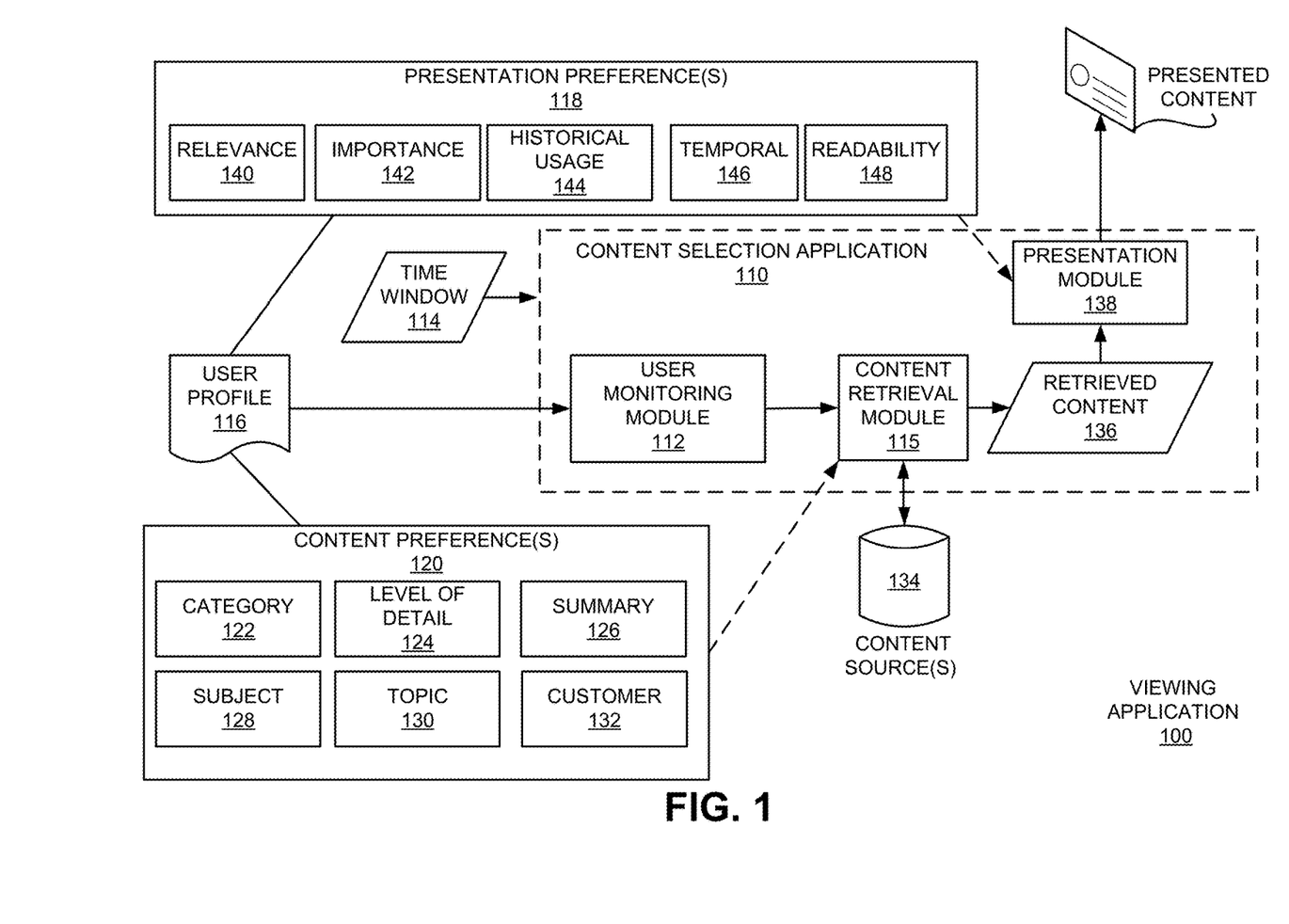
FIG. 1 illustrates a block diagram of a viewing application with a content selection application configured to present content within a time window, according to various embodiments.

FIG. 1 illustrates a block diagram of a viewing application 100 with a content selection application 110 configured to present content within a time window, according to various embodiments. According to various embodiments, the content selection application 110 can be a separate module that is part of a viewing application 100. The viewing application 100 can be responsible for presenting information to a user. Examples of a viewing application 100 may include a web browser, operating system, video application, a calendar application, a content management system, an email application, or document reader. The viewing application 100 can have a content selection application 110 to obtain recommendations to fit content within a window of time.

The content selection application 110 can receive a time window 114 and a user profile 116. In various embodiments, the time window 114 and user profile 116 may be shared by the viewing application 100. The time window 114 and user profile 116 may also originate from a user that is external to the viewing application. The content selection application 110 can fetch content from one or more content sources 134 to present to a user of the viewing application 100. The content selection application 110 can have a user monitoring module 112, a content retrieval module 115, and a presentation module 138.

The user monitoring module 112 can monitor activities of a user on the viewing application 100. For example, the user monitoring module 112 can keep a log of all user activity that occurs within the viewing application 100. In various embodiments, the user monitoring module 112 can be configured to assemble the user profile 116 based on monitored user activities. In various embodiments, the viewing application 100 can communicate with the lower level functions of a computing system, e.g., memory and network usage for more than a one user. The user monitoring module 112 can be also configured to receive or derive a user profile 116 and a time window/window of time 114.

The time window 114 can be sent by the viewing application 100 or be inferred as a result of the monitoring of activities. For example, a user may have a meeting that finished 10 minutes early. The viewing application 100 user may provide a time of 10 minutes or the time may be inferred by the viewing application 100. Since nothing else is scheduled during this time, a time window 114 of 10 minutes may be sent to the user monitoring module 112.

The content selection application 110 may have the ability to show a user's interest that can fit to a window of 15 minutes. The content selection application 110 may derive the various business, personal and other interests that the user has stored as preferences, and from this return a table of options that the user can select from (e.g., latest updates for a Customer Relationship Management opportunity to fit into 15 minutes, or latest updates to a football tournament to fit into 15 minutes).

In various embodiments, the content selection application 110 or user monitoring module 112 can track unexpected free time (e.g., the time window 114) for a user through a calendar. If the user calendar has no specific description for a selected time slot, the content selection application 110 can choose from a variety of methods to determine which content to associate with a given time window 114.

The time window 114 may be modified. Situations may arise if an upcoming event was cancelled or changed and allowed them more time than the user thought they had. For example, if the user thought that they had 60 minutes to spare but now realizes that they have 30 due to a new event that has just arrived. Decreasing or increasing the time window can result in a reduction or expansion of the associated data set to fit the time window.

In various embodiments, the content selection application 110 can determine the time window 114 based on how much time would be needed to catch up on a particular topic. The content selection application 110 could then communicate the time window 114 to the user and the user can decide if they want to proceed with the data that the content selection application 110 would furnish, or a summarization of the content to fit the time window.

In various embodiments, the time window 114 can be predetermined. The user can schedule times on their calendar to catch up on business or personal interests. For example, a user can schedule 60 minutes on their calendar for a future data and denote this calendar entry as "catch up on CRM Opportunity X". The content selection application 110 may present the relevant content prior to this event. For example, the scheduled time arrives and the user is presented with the desired content to fit the prescribed time and summarized if a summarization preference was enacted.

Each user of the viewing application 100 can also have a user profile 116 associated with a user. The user profile 116 can contain data regarding the user of the viewing application 100. The user profile 116 can indicate a variety of user preferences within the viewing application 100 and the content selection application 110. For example, the user profile 116 can contain a history the content that the user reads most frequently. The user profile 116 can specify a content preference 120 and a presentation preference 118 which can be used by other components of the content selection application 110. For example, the content retrieval module 115 can use the content preference 120, and the presentation module 138 can use the presentation preference 118.

The content preference 120 can concern what content source 134 or content repository is accessed by the content selection application 110. In various embodiments, the content (which may be used interchangeably with the term content item) may be fetched from a content source 134 and the content preference 120 may indicate a preference for the content that is fetched. The presentation preference 118 can concern how the content is presented to the user. The presentation preference 118 may indicate which content from the content source 134 is presented first a user based on a limited time window 114. Examples of the content preference 120 and presentation preference 118 can be used interchangeably. For example, a content preference 120 may also include a relevance 140 preference and a presentation preference 118 may include a category preference 122.

The content preference 120 can be selected by the user or determined by the viewing application 100 based on a history of content viewed by the user. For example, the viewing application 100 may record the times that a content item is viewed. The viewing application 100 may infer a number of content preferences 120 from the interaction between the content item and the user. For example, if over 70% of all content items related to quantum computing but only the abstract was viewed, then the viewing application 100 can infer that the user has a preference toward quantum computing and looking at summaries. Examples of types of content preferences can include: a category 122, a level of detail 124, a summary 126, a subject 128, a topic 130, or a customer 132.

The category 122 preference can refer to content that is related to a particular category, e.g., business/personal. The level of detail 124 can refer to content that is detailed or content that has schematics attached. The summary 126 can show that the user has a preference for summaries of content.

In various embodiments, the user can select a summarization option to indicate a preference for the summary 126. The content selection application 110 can implement a summarization operation to summarize content to fit into a window of time 114. The summary 126 could allow more content to be discerned in a smaller associated time window 114. For example, a summarization of a 60 minute data set could allow the user to see a broader set of updates owed to the system by summarizing the 60 minute content to a 15 minute window. The content selection application 110 may sense of the degree of summarization needed by the relationship of content duration to the window of time. For example, if there is 60 minutes of content and 5 minutes of a time window then the content selection application 110 can quickly infer a computational executive summary.

The content selection application 110 can deliver the content that is shortened to fit into the time window 114. The content selection application 110 can also incorporate prioritization and relevance to optimize the time window being used. For example, if the user has specified a goal to receive content on a CRM Opportunity and has 10 minutes, and there is a predicted 60 minutes of content, then the content selection application 110 can further reduce the content duration to 10 minutes by shortening the content.

The subject 128 can refer to a subject of the content such as cat videos, or quantum computing. The customer 132 preference can refer to content related to a particular customer. The topic 130 can refer to the heading or keywords of the content. The topic can be generated based on a list of trending topics in a social network, e.g., CRM project or football topics that might be proposed because they are popular with user in the social network.

The content retrieval module 115 can identify and use the content preference 120 from the user profile 116. Once the content preference 120 is received, then the content retrieval module 115 can obtain content from one or more content sources 134 based on the content preference 120. For example, if the user has a subject 128 content preference for cat care articles, then the content retrieval module 115 can fetch various articles related to cat care from the content source 134. According to various embodiments, the content retrieval module 115 can optionally present the user with a list of content sources 134 to select from in lieu processing the content preferences 120.

The content source 134 may include a local storage or may include interfacing with a web browser to access a search engine or news aggregation system. The content source 134 may be determined from the history of the user. For example, the content retrieval module 115 may retrieve cat care articles from a cat care blog based on the user's previous visits to the cat care blog. The content source 134 may be accessed using any number of permissions including from an external application. For example, if an article exists outside of the ecosystem of the viewing application 100 and requires new permissions, then the content retrieval module 115 can access the content source 134 through an application programming interface (API). The credentials (e.g., a user name and password) of the user can be stored within the content retrieval module 115.

The content retrieval module 115 can retrieve the retrieved content 136 from the content source 134 based on the content preference 120 of the user. The retrieved content 136 may be indexed or stored locally within the viewing application 100. For example, the articles related to cat care may be indexed by recording the Uniform Resource Locator (URL) of the article. The articles related to cat care may also be stored locally, e.g., as hypertext markup language (HTML) files. If stored locally, then a page file may be used or the content may be stored within the memory system. The retrieved content 136 may exist within the content selection application 110 until it is accessed again by the presentation module 138.

The time window 114 may be received before or after the content retrieval module 115 retrieves the content. If the time window 114 is received before, then the content may be influenced by the time window 114. For example, if the time window 114 is 4 minutes, then any content that takes longer than 4 minutes, can be excluded in the retrieved content 136. If the time window 114 is received after the content is retrieved, then a variety of presentations options can be presented to the user based on the time window 114.

In various embodiments, the presentation module 138 can access the presentation preference 118 and the retrieved content 136 to prioritize the retrieved content 136 and produce a number of presentation options. Each presentation option can be one or more content items that fit into the time window 114. The content selection application 110 can select between the presentation options based on additional presentation preferences. For example, if a first presentation option has 2 articles related to quantum computing and a second presentation option has 3 articles related to cat care, and if the user prefers content that has a high readability, then the content selection application 110 can select the second presentation options. The presentation module 138 can prioritize the retrieved content 136 for the user based on the time window 114 and the presentation preference 118. Once a presentation option is selected at the presentation module 138, then the content items in the presentation option can be presented to the user. The user may efficiently view the content items.

The presentation preference 118 can concern how the content is presented. The presentation preference 118 can also be specified by the user or determined by the viewing application 110. For example, the viewing application 100 can infer that a user that works in finance prefers summarized content or that the user prefers news articles that are written within the past 4 hours. Examples of types of presentation preferences can include: a relevance 140, an importance 142, a historical usage 144, a temporal preference 146, and readability 148.

The relevance 140 preference can describe relevant content. The relevance 140 can be indicated by a relevance score of the content. For example, if a user that works in dog shows is only interested in articles related to dog shows, then the articles with a high frequency of the word dog and show could have a higher relevance score.

The importance 142 preference can describe an urgent type of content. For example, an article sent by a supervisor can have a higher importance than an article sent by a personal contact. The importance 142 can be user defined. For example, content from a social network may be deemed more important depending on the user. The historical usage preference 144 may be based on the content that the user has viewed in the past. For example, a medical student may continuously go back to the medical dictionary and would likely do so in the future. The presentation module 138 may first try to select a content source 134 based on importance (i.e., does the user have any urgent email that has not yet been opened, or does the user have a task management repository that requires a task to be completed urgently). The importance 142 preference can include selecting the mail inbox if there is an unread note from a manager.

The temporal 146 preference can refer to the time that the content was written or posted. For example, a user may prefer to read recent news articles first. The temporal preference 146 can also indicate that the presentation module 138 should select the content which was viewed least recently so that the user can catch up on the new documents. The temporal preference 146 can also refer to the amount of time that a reader is predicted to take to consume the content. For example, a user can have a predicted duration of 20 minutes to watch a 20 minute video or take 5 minutes to read an article of a particular topic. The presentation module 138 can predict the duration of the content item by examining the content consumption rate of contacts within a social network. The consumption rate of content from contacts may indicate the consumption rate of the user.

The readability 148 preference can refer to the ease of reading the content for the user. In fitting the desired window, the content selection application 110 can also account for the historic readability patterns evidenced by the user in order to ensure that the relevant content that can be read by this user in the time allocated. The content selection application 110 can examine content by looking at past user patterns based on historical usage (e.g., the average time it has taken the user to read an email over the previous 1,000 emails, or the average time a user takes to read N community entries of Y words each).

The readability 148 can be indicated by a content readability index. The content readability index can be determined by the viewing application 100 based on the difficulty of the content. For example, the viewing application 100 can examine the frequency of high-syllabic words in the content to influence the content readability index. The viewing application 100 can also examine the history of user to determine the time that a user spent on a particular content. For example, an article on quantum computing can differ significantly in readability than an article about cat videos. If the user spends 2 hours on a 4-page article about quantum computing, then the content readability index would differ significantly from a 2 minute, 5-page article on cat videos.

The presentation module 138 can prioritize the content based on the presentation preferences 118, and may also determine the user interest in specific content. The content selection application 110 may determine whether the user visits the content source 134 daily and whether the user has done so recently. If there is no way to prioritize the content, then all content may be prioritized equally.

Figure 2:
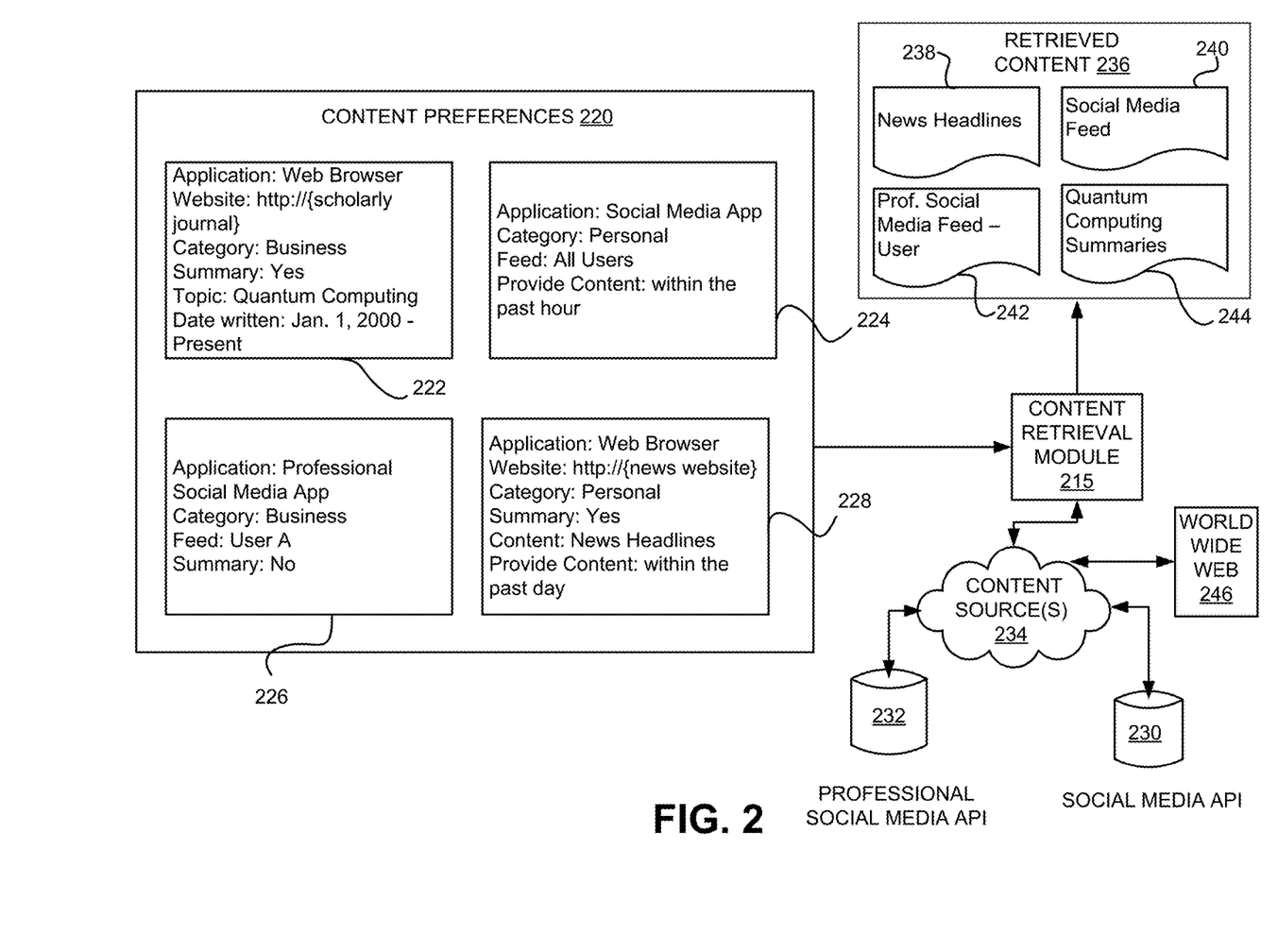
FIG. 2 illustrates a block diagram of an operation of a content retrieval module, according to various embodiments.

FIG. 2 illustrates a block diagram of an operation of a content retrieval module 215, according to various embodiments. The content retrieval module 215 can correspond to the content retrieval module 115 from FIG. 1. Various components of the content retrieval module 215 can correspond to modules in FIG. 1. For example, the content source 234 can correspond to content source 134 in FIG. 1, the content preferences 220 can correspond to content preferences 120 in FIG. 1, and the retrieved content 236 can correspond to the retrieved content 136 in FIG. 1. The content retrieval module 215 can use the content preferences 220 to retrieve the retrieved content 236 from the content source 234.

As an example to illustrate the mechanism of the content retrieval module 215, the retrieved content 236 can include news headlines 238, social media feed 240, a professional social media feed for a particular user 242, and quantum computing summaries 244. The retrieved content 236 may be obtained based on the content preferences 220.

The content source 234 can be internet-based. For example, the content source 234 can be one or more internet-based applications, e.g., a professional social media API 232, and a social media API 230. The content source 234 can also interface with a network address or the World Wide Web (WWW) 246. Both the professional social media API 232 and the social media API 230 may both refer to social media applications where the data feed is accessed. The API may be a gateway to access the data within the application. The content retrieval module 215 can either push or pull the content. For example, a user may request the data from the content source 234, and the content may be narrowed by the content preferences 220. The user can also be pushed a large amount of content that needs to be filtered, such as a social media feed of another user.

The content preferences 220 are communicated to the content retrieval engine 215. In various embodiments, the content preferences 220 can be provided for specific types of content or applications. For example, the content preference 222 can correspond to the retrieved content for quantum computing summaries 244. The content preference 222 can indicate a targeted application, i.e., a web browser. The content preference 222 can be further limited by the website within the web browser. The content preference 222 can be limited to business applications of quantum computing and summaries. The content retrieval module 215 can access the WWW 246 and retrieve the quantum computing summaries 244 for dates between Jan. 1, 2000 and the present day.

Another example can be for the retrieved content social media feed 240. The content preference 224 can specify that the content preference is for the social media application. The content preference 224 can specify that the category is personal and to limit the content from the social media feed to content within the past hour. The content retrieval module 215 can retrieve the social media feed 240 from the social media API 230 limited to the past hour. Another example can be for the professional social media feed for a particular user 242. The content preference 226 can classify the social media feed as "business" and limit the feed to the particular user. The content retrieval module 215 can retrieve the professional social media feed for the particular user 242 from the professional social media API 232.

In another example, the content retrieval module 215 can retrieve news headlines 238 from the WWW 246. The content retrieval module 215 can retrieve the news headlines 238 based on the content preference 228. The content preference 228 can provide the website of where to retrieve the news headlines 238, the preference for a summary, and to limit the news headlines 238 to within the past day. The content retrieval engine 215 can apply content preference 228 when the news headlines 238 are retrieved from the WWW 246.

Figure 3:
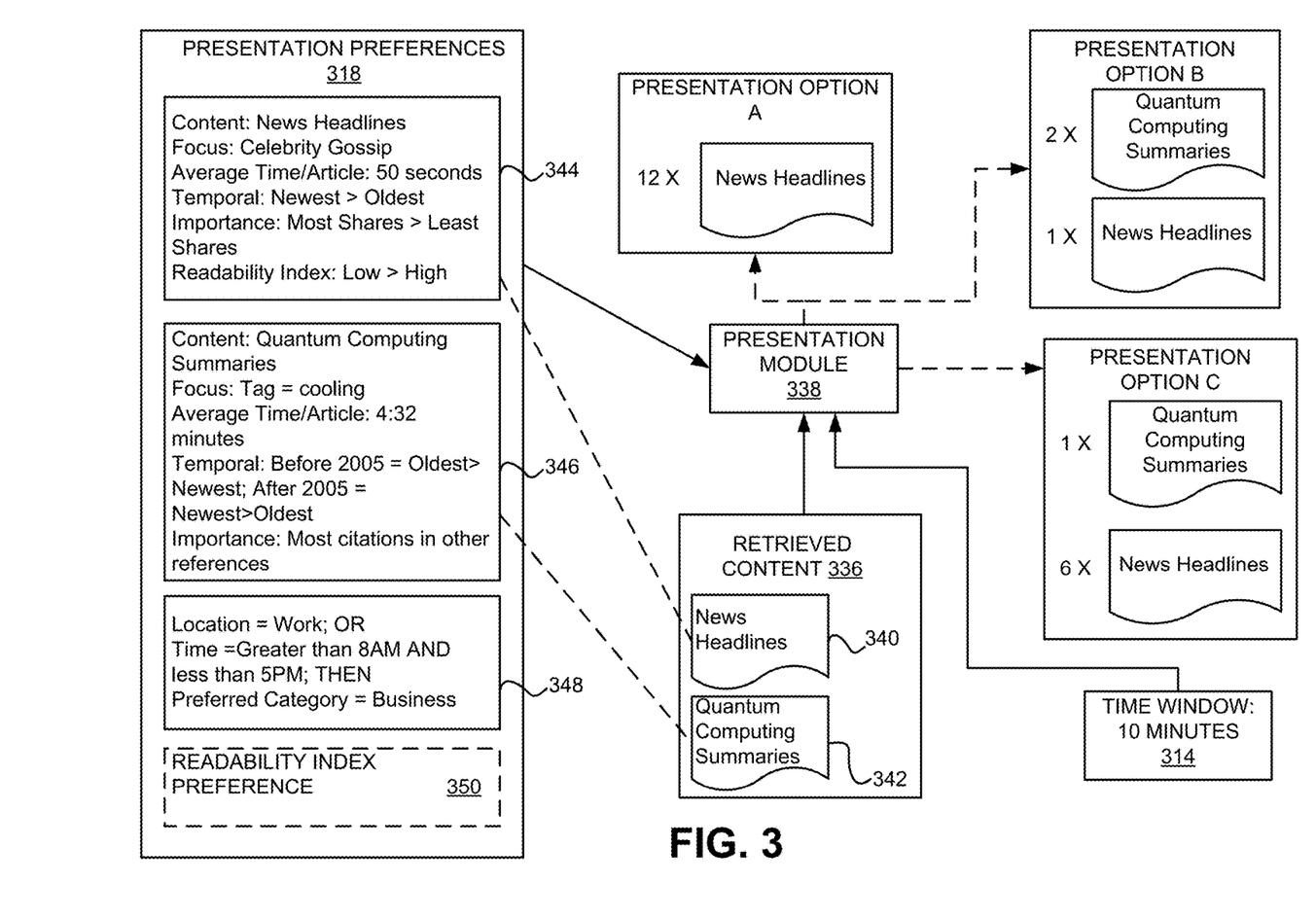
FIG. 3 illustrates a block diagram of the operation of a presentation module, according to various embodiments.

FIG. 3 illustrates a block diagram of the operation of a presentation module 338, according to various embodiments. The presentation module 338 can correspond to the presentation module 138 of FIG. 1. The presentation module 338 can receive retrieved content 336 and a time window 314. The retrieved content 336 and time window 314 can correspond to the retrieved content 136 and time window 314 from FIG. 1 respectively. In various embodiments, the retrieved content 336 can be the same as the retrieved content 236 from FIG. 2 and is shown to demonstrate the operation of the presentation module 338.

The news headlines 340 and quantum computing summaries 342 can be obtained in a similar manner to the news headlines 238 and quantum computing summaries 244 in FIG. 2. The news headlines 340 can include a plurality of news headlines and the quantum computing summaries 342 can include a plurality of quantum computing summaries. Each category of retrieved content 336 can be prioritized by the presentation module 328.

The presentation preferences 318 can indicate how the presentation module 338 presents the retrieved content 336. The presentation preferences 318 can be used to prioritize the retrieved content 336 into one or more presentation options. In addition to the presentation preferences that correspond with the retrieved content 336, the presentation preferences 318 may also include conditional rules, e.g., preference 348. The presentation preferences 318 can also include a readability index preference 350 of the retrieved content 336.

The presentation preference 344 and presentation preference 346 can correspond to news headlines 340 and quantum computing summaries 342. More presentation preferences are possible but for the sake of simplicity, only the presentation preference for news headlines 344 and the presentation preference for quantum computing summaries 342 are discussed.

The presentation module 338 can receive the presentation preference for the news headlines 344. The presentation preference 344 can focus on celebrity gossip. Thus, for a plurality of news headlines, news concerning celebrities can be focused on. The presentation preference 344 can also include a time estimate to read a headline based on historical values for similar content. The presentation preference 244 can also add additional prioritization criteria such as displaying the newest content first or the content that has the highest number of shares. The presentation preference can be used to prioritize individual news headlines 340 with the newest and most shared news headline about celebrity gossip having the highest priority.

The presentation module 338 can also receive the presentation preference for the quantum computing summaries 346. The presentation preference 346 can give a higher priority to summaries related to cooling. Multiple conditions can be set for a range of temporal presentation preferences. For example, the presentation preference 346 can include a preference to present quantum computing summaries that were written before 2005 from oldest to newest, and present quantum computing summaries that were written after 2005 from newest to oldest. The number of citations by other quantum computing articles can also influence the priority. Therefore, the newest article related to quantum computing cooling with frequency citations may be given the highest priority by the presentation module 338.

One or more general presentation preferences, e.g., preference 348, can be defined within the presentation preference 318. The presentation module 338 can create various presentation options based in part on the one or more general presentation preferences 348. The general presentation preference 348 can indicate conditions that are outside of the preferences for specific content. The presentation preference 348 can set an initial condition, that the location is at work or that the time is between the hours of 8 AM and 5 PM. If the initial condition is met, then the preference for the content that has the category "business" can be implemented by the presentation module 338.

The presentation preference 318 can also include a readability index preference 350. In various embodiments, the readability index preference 350 can indicate a preference for content with a high or low level of readability. For example, the user may prefer content with a minimum level of readability, i.e. a celebrity gossip magazine will have a higher readability than a quantum computing summary. The readability index may be a numerical score that the presentation module 338 can use to assemble the presentation options. The readability index preference 350 can also include the readability index data for the content. For example, each news headline from the news headlines 340 content can have a content readability index. The content readability index can be associate with each entry in the retrieved content 336.

The presentation module 338 can use the presentation preferences 318 to assemble various presentation options. For the purposes of illustration, 3 presentation options are shown: presentation option A, presentation option B, and presentation option C. In preparing the presentation options, the presentation module 338 can use a time estimate. Preference 344 and presentation 346 have average time/article estimates based on historical behavior regarding the content type. For example, a celebrity gossip news headline may have taken a user only 50 seconds per article while a quantum computing summary may have taken a user 4:32 minutes per article.

The time estimate can be more specific for each content item. In various embodiments, the time estimate can be tailored for each individual content item using the readability index of the content. For example, a news headline 340 with a higher instance of multi-syllabic words and a high-length may have a higher readability index than average. The time estimate can be increased beyond the average time of 50 seconds. In another example, the news headline 340 time estimate can be predicted based on the historical time required to read a content with a similar readability index.

The presentation module 338 can receive a time window 314 for the user. In the example, the time window is 10 minutes. The presentation module 338 can ensure that the content fits into the time window based on the time estimate of the content. The presentation options can be prepared by determining the content that fits into the time window. For example, presentation option A can have 12 news headlines with an average time of 50 seconds each for a total estimated time of 10 minutes. Presentation option B can have 6 news headlines and 1 quantum computing summary for an aggregate estimated time of 9:32 minutes. Estimated times for the presentation option are not required to fill out the entire time window. For example, presentation option B can have 2 quantum computing summaries with an average time of 4:32 minutes each article and 1 news headline at 50 seconds for an aggregate estimated time of 9:54 minutes. More combinations of presentation options are possible. Presentation options A, B, and C are used for illustrative purposes.

The presentation module 338 can select a presentation option to recommend to a user based on a general presentation preference 348. The general presentation preference 348 can indicate that if the user is at work or the time is between 8 AM and 5 PM, then select a business category, e.g., quantum computing summaries. Therefore, the presentation module 338 can also receive a location from the user or a time from the viewing application to determine if the condition within the general presentation preference 348 exists. The quantum computing summaries 342 may be categorized as business, e.g., from the content preference 222 in FIG. 2. Assuming that the time is between 8 AM and 5 PM, then the presentation module 338 can select presentation option B because of the prevalence of the quantum computing summaries. The presentation module 338 can present the content items in presentation option B to the user.

Figure 4:
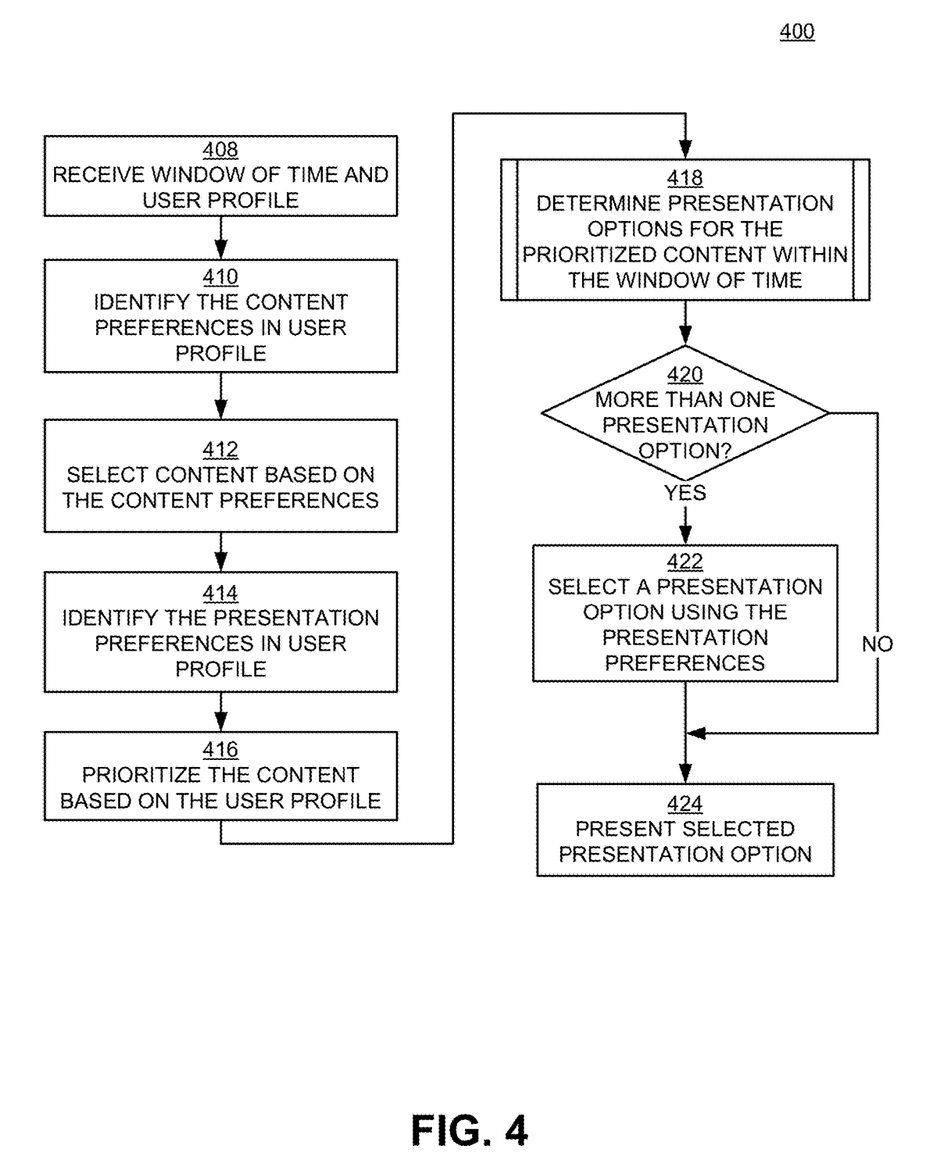
FIG. 4 illustrates a flowchart of a method for presenting content to a user based on the user's window of time and a user profile, according to various embodiments.

FIG. 4 illustrates a flowchart of a method 400 for presenting content to a user based on the user's window of time and a user profile, according to various embodiments. The method 400 can apply to a content selection application, e.g., the content selection application 110 from FIG. 1, hosted by a computer. The method 400 can include retrieving content based on a user profile and prioritizing the retrieved content based on the user profile. The method 400 can also include selecting the retrieved content to fit within a window of time. The method 400 begins at operation 408.

In operation 408, the content selection application can receive a window of time and a user profile. As mentioned herein, the user profile has a variety of preferences for a user of the viewing application. The window of time and the user profile can be received from the viewing application as a result of user input or determination by the viewing application. In operation 410, the content selection application can identify the content preferences within the user profile. The content preferences can be stored in a separate file, e.g., an Extensible Markup Language (XML) file, or annotated to make the content preference distinguishable from other preferences in the user profile.

In operation 412, the content selection application can select a plurality of content items based on the content preferences. In various embodiments, the content selection application can use a content retrieval module to retrieve the content from various content sources, including content sources that are external to the viewing application. For example, the content retrieval module can fetch content from a third-party database or an external application programming interface. In various embodiments, the content retrieval module can retrieve the plurality of content items from a content source that is within the viewing application, e.g., Hypertext Markup Language (HTML) files. Once the content items are selected, the content items can be stored within the memory or storage. The content items can be stored into a page file or may be indexed at the source for quick retrieval. For example, if the content items are HTML pages, then the URL can be recorded in an index file so that the content retrieval module can readily access the HTML page. The plurality of content items can be selected based on the content items discussed herein. Once the content selection application selects the plurality of content items, then the method 400 continues to operation 414.

In operation 414, the content selection application can identify the presentation preferences within the user profile. In various embodiments, operation 414 can occur in unison with operation 410 since both the presentation preference and the content preference are identified from the user profile. In operation 416, the content selection application can prioritize the plurality of content items, based on the presentation preference. The result of the prioritization is a plurality of prioritized content items. A presentation module can prioritize the content items that are retrieved by the content retrieval module. The content can be prioritized using the presentation preferences discussed herein. Once the content is prioritized, then the method 400 can continue to operation 418.

In operation 418, the content selection application can determine a presentation option, for the plurality of prioritized content items. The presentation option can be a selection of one or more presented content items selected from the prioritized content items. A component of the content selection application, e.g., a presentation module, can select the one or more presented content items based on the priority of the content items. The presentation option can include any number of content items that fit into the window of time, e.g., the window of time provided in operation 408. A high-priority content item may be included into a presentation option before a low-priority content item. The determination of what is included in the presentation option can be discussed further herein. In various embodiments, each presentation option can be stored in memory or storage prior to selection of a presentation option. For example, the presentation option can be an XML file of all the different content items included. The XML file can contain a reference to the content item. Once the content selection application determines the presentation options for the prioritized content items, then the method 400 continues to operation 420.

In operation 420, the content selection application can determine whether there is more than one presentation option. If there is not more than one presentation option selected from the prioritized content, then the method 400 continues to operation 424. If there is more than one presentation option, then the method 400 continues to operation 422.

In operation 422, the content selection application can select a selected presentation option from the one or more presentation options. The selected presentation operation can be a presentation option that is selected by the content selection application. In various embodiments, the presentation module can indicate which presentation option should be selected from the presentation options. The presentation module can use the presentation preferences described herein. For example, if the presentation preference indicates a preference for viewing unread email content during work hours, then the presentation option that contains the most proportional email content may be selected. Once the selected presentation option is selected, then the method 400 continues to operation 424.

In operation 424, the content selection application can present the presented content item corresponding to the presentation option. The presented content item can refer to a content item that is presented by the viewing application to a user. The user may interact with the content item in a manner consistent with the viewing application. More than one presented content item can exist in the presentation option. In various embodiments, the presentation module can select each presented content item from the presentation option to be presented individually using the presentation options. For example, assuming that the selected presentation option contains content items of 2 quantum computing summaries, one 400 words and the other 200 words, and 1 celebrity gossip news headline, and the presentation preference indicates a business category preference and a preference for shorter articles, then the presentation module can display the 200-word quantum computing summary first, the 400 quantum computing summary second, and the celebrity gossip news headline third. In various embodiments, the presentation module can also display all content from the selected presentation option simultaneously for the viewing application to further select the content. Each content item may be advanced by the user after the content is viewed.

Figure 5:
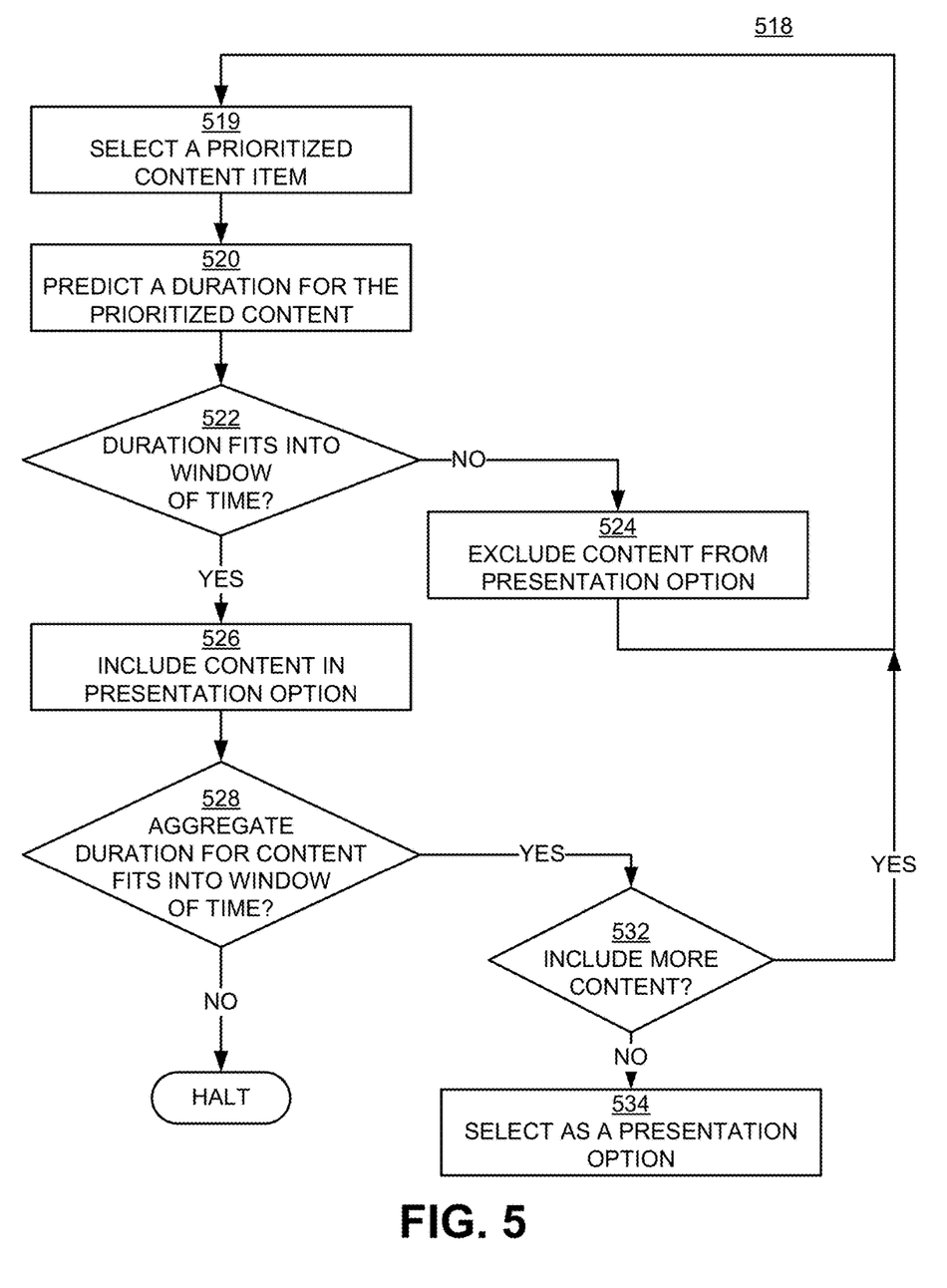
FIG. 5 illustrates a flowchart of a method for determining one or more presentation options for content within a window of time, according to various embodiments.

FIG. 5 illustrates a flowchart of a method 518 for determining one or more presentation options for content within a window of time, according to various embodiments. The method 518 can correspond to operation 418 in FIG. 4. The method 518 can include predicting a duration for a content item, and ensuring that the predicted duration for an individual content item and an aggregate duration for a group of content items fit into the window of time. Aspects of the method 518 can be performed by the presentation module of the content selection application. The method 518 begins at operation 519.

In operation 519, a prioritized content item, i.e., the content items retrieved by the content retrieval module based on the content preferences and prioritized based on the presentation preferences, can be selected for possible inclusion in a presentation option. In operation 520, the presentation module can predict a predicted duration for each prioritized content item from the plurality of prioritized content items. The predicted duration can be a duration or time for a user to view content. In various embodiments, the presentation module predicts the duration based off of past performance by a user. For example, if the user takes an average of 40 minutes to read a content item of a particular word count and category, then the prediction module can predict that the user will take 40 minutes to read a content item of the particular word count and category. Once the duration is predicted, then the method 518 can continue to operation 522.

In operation 522, operation 524, and 526, the presentation module can create or assemble one or more presentation options that have at least one prioritized content item with the predicted duration that fits into the window of time. For example, if there is one presentation option having one prioritized content item, then the predicted duration for the prioritized content item should be less than the window of time. In various embodiments, the presentation module can create a presentation option from one or more prioritized content items. If the prioritized content item does not have a predicted duration that fits into the window of time, then the prioritized content item is not selected for a presentation option. The presentation option can be a grouping of one or more prioritized content items that meet certain presentation preferences. The presentation option may be a temporary construct, according to various embodiments. For example, the presentation option may be modified at any point to include or not include particular content items.

In operation 522, the presentation module can determine whether the predicted duration for a prioritized content item from the plurality of prioritized content items fits into the window of time. The predicted duration for the prioritized content item can fit into the window of time if the predicted duration is less than the window of time. The predicted duration may not fit within the window of time if the predicted duration is greater than the window of time. For example, if the predicted duration for a user to view the content is 10 minutes but the window of time is 5 minutes, then it can be assumed that a user will not be able to view 10 minutes of content within 5 minutes without summarization. Various parameters may be refined by the user to change the predicted duration of content that can be viewed. If the predicted duration does not fit into the window of time, then the method 518 can continue to operation 524. If the predicted duration fits into the window of time, then the method 518 can continue to operation 526.

In operation 524, the presentation module can exclude the prioritized content item from the presentation option. The presentation module can exclude the prioritized content item from the presentation option by not including it into a presentation option. After the prioritized content item is excluded, another prioritized content item can be selected in operation 519. In various embodiments, summarized content can be selected if the predicted duration does not fit into the window of time. The summarized content can be selected as a content preference and retrieved by the content retrieval engine and selected in operation 519. In operation 526, the presentation module can include the prioritized content item into the presentation option. After inclusion of the prioritized content item, then the method 518 can continue to operation 528.

In operation 528, the presentation module can determine whether an aggregate predicted duration for the content items in a presentation option from the one or more presentation options fits into the window of time. The aggregate predicted duration, or aggregate duration, can be an aggregate of all of the predicted durations for each content item within the presentation option. For example, a presentation option with a first content item having a predicted duration of 10 minutes, and a second content item having a predicted duration of 10 minutes, can have an aggregate predicted duration of 20 minutes. If the aggregate duration does not fit into the window of time, then the method 518 can halt. One or more content items can be removed from the presentation option to make the aggregate duration fit into the window of time, according to various embodiments. If the aggregate duration does fit into the window of time, then the method 518 can continue to operation 532.

In operation 532, the presentation module can determine whether to include more prioritized content items into the presentation option. The presentation module may determine that there are more prioritized content items to be included into the presentation option if the aggregate duration of the presentation option is substantially less than the window of time. For example, if there are 2 content items with predicted durations of 10 minutes each (an aggregate duration of 20 minutes, and the window of time is 60 minutes, then the presentation module can determine that more content items are required. If the aggregate duration is substantially higher than the window of time, then the presentation module may determine not to include more content.

The presentation module can modify the tolerance of the aggregate duration. For example, if the aggregate duration of the presentation option is 20 minutes, but the time window is 21 minutes, then the presentation option may determine that the aggregate duration of the presentation option is not substantially less than the time window. If the presentation module determines that there are more content items that need to be included, then the method 518 continues to operation 519 where a new prioritized content item is selected. If the presentation module determines that there are no more content items that need to be included, then the method 518 continues to operation 534.

In operation 534, the presentation module can select the presentation option as a possible presentation option. The presentation option can be further selected by the presentation module from a plurality presentation options based on the presentation preferences.

Figure 6:
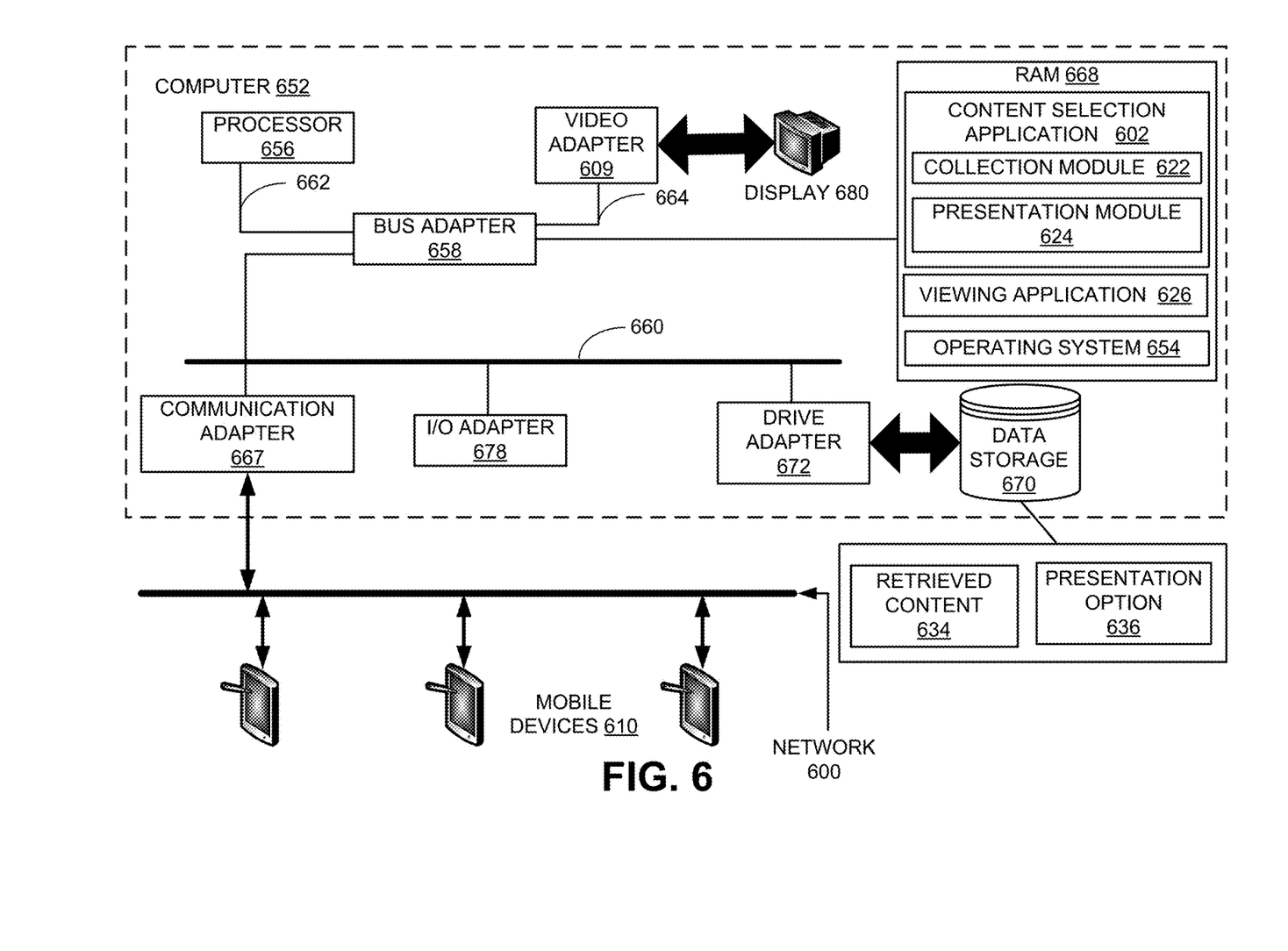
FIG. 6 illustrates a block diagram of automated computing machinery, according to various embodiments.

FIG. 6 illustrates a block diagram of automated computing machinery, according to various embodiments. The computing machinery may include example computer 652 useful in performing aspects of the disclosure, according to various embodiments. The computer 652 of FIG. 6 includes at least one computer processor 656 or 'CPU' as well as random access memory 668 ('RAM') which is connected through bus adapter 658 to processor 656 and to other components of the computer 652.

The RAM 668 may host a content selection application 602 and a viewing application 626. The computer 652 allows a content selection application 602 to analyze the content selected for the viewing application 626. The content selection application 602 can have a collection module 622 and a presentation module 624. The collection module 622 can collect a variety of content items based on the content preferences of the content selection application 602. The presentation module 624 can assemble retrieved content items 634 into one or more presentation options and select a presentation option based on the presentation preferences 636. The retrieved content items 634 can be stored into the data storage 670.

The RAM 668 may include an operating system 654. Operating systems useful for record filtering according to embodiments of the present invention include UNIX®, Linux®, Microsoft XP™, AIX®, IBM's i5/OS™, and others. The operating system 654 are shown in RAM (668), but many components of such software typically are stored in non-volatile memory also, such as, for example, on a disk drive 670.

The computer 652 may also include disk drive adapter 672 coupled through expansion bus 660 and bus adapter 658 to processor 656 and other components of the computer 652. Disk drive adapter 672 connects non-volatile data storage to the computer 652 in the form of disk drive 670. Disk drive adapters useful in computers include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on. The data storage 670 may include one or more storage devices in a tiered or non-tiered configuration.

The data storage 670 can include the retrieved content 634 and the presentation option 636. The retrieved content 634 can be stored after the collection module 602 collects the content items from a variety of sources in accordance with the content preferences. One or more retrieved content 634 items can compose a presentation option 636. One or more presentation options 636 can be stored in the data storage 670 and selected by the presentation module 624 based on the presentation preferences.

The example computer 652 includes one or more input/output ('I/O') adapters 678. I/O adapters implement user-oriented input/output through, for example, software drivers and computer hardware for controlling output to display devices such as computer display screens, as well as user input from user input devices 681 such as keyboards and mice. The example computer 652 includes a video adapter 609, which is an example of an I/O adapter specially designed for graphic output to a display device 680 such as a display screen or computer monitor. Video adapter 609 is connected to processor 656 through a high speed video bus 664, bus adapter 658, and the front side bus 662, which is also a high speed bus.

The example computer 652 includes a communications adapter 667 for data communications with other computers 610, e.g., mobile devices, and for data communications with a data communications network 600. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, an engine, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for presenting a content item from a plurality of content items for a window of time comprising:
   receiving, by a processor, the window of time and a user profile;
   identifying a content preference and a presentation preference within the user profile;
   selecting the plurality of content items based on the content preference;
   prioritizing the plurality of content items, based on the presentation preference, that results in a plurality of prioritized content items;
   determining, for each prioritized content item, a topic of the prioritized content item;
   grouping the plurality of prioritized content items according to at least respective topics of each prioritized content item;
   generating a plurality of presentation options, each presentation option including two or more prioritized content items, wherein generating the plurality of presentation options includes:
      predicting a predicted duration for each prioritized content item from the plurality of prioritized content items; and
      creating two or more presentation options, wherein each presentation option has an aggregate estimated time that is less than or equal to the window of time, the aggregate estimated time for a respective presentation option being a combined total of the predicted durations for each prioritized content item in the respective presentation option;

determining a selected presentation option from the plurality of presentation option, the selected presentation option having two or more presented content items; and presenting the presented content items corresponding to the selected presentation option.

2. The method of claim 1, wherein selecting the plurality of content items includes:

storing the plurality of content items.

3. The method of claim 1, wherein determining the selected presentation option includes:

selecting the selected presentation option from the two or more presentation options based on the presentation preference.

4. The method of claim 1, further comprising:

determining whether the predicted duration for a prioritized content item from the plurality of prioritized content items fits into the window of time; and excluding, in response to the predicted duration for the prioritized content item from the plurality of prioritized content items not fitting into the window of time, the prioritized content item from the two or more presentation options.

5. The method of claim 1, wherein the content preference is selected from at least one of a category preference, a level of detail preference, a summary preference, a subject preference, a topic preference, and a customer preference for the content item.

6. The method of claim 1, wherein the presentation preference is selected from at least one of a relevance preference, an importance preference, a historical usage preference, and a temporal preference.

7. The method of claim 1, wherein prioritizing the plurality of content items includes:

determining a content readability index for each content item, wherein the content readability index is a numerical score that indicates a level of readability of a content item; and modifying a priority of the plurality of prioritized content items based on the content readability index.

8. The method of claim 1, the method further comprising:

monitoring activities of the user in a viewing application;

logging the activities of the user;

assembling, based on the monitoring, the user profile, wherein the user profile includes a history of content that the user reads most frequently; and determining an order of the presented content items in the selected presentation option based on the presentation preference, wherein the presented content items are presented according to the determined order.

9. The method of claim 8, wherein the identifying the content preference includes:

determining, using the history, a topic for each content item previously read by the user;

determining that the user read only a particular portion of the content items related to a particular topic; and generating a content preference for the user indicating that the user only reads the particular portion of content items related to the particular topic.

10. The method of claim 1, wherein the predicting the predicted duration for each prioritized content item includes:

examining a content consumption rate of a plurality of users, wherein plurality of users are contacts of the user in a social network, and wherein the content consumption rate is the rate at which the users are able to read the content.

11. A system for use with a computer that is configured to host a viewing application that allows a plurality of content items to be presented to a user, the system comprising:

one or more computer processor circuits that are configured to host a sharing analysis application that is configured to perform a method comprising:

receiving a window of time and a user profile corresponding to the user;

identifying a content preference and a presentation preference within the user profile;

selecting the plurality of content items based on the content preference;

prioritizing the plurality of content items, based on the presentation preference, that results in a plurality of prioritized content items;

determining, for each prioritized content item, a topic of the prioritized content item;

grouping the plurality of prioritized content items according to at least respective topics of each prioritized content item;

generating a plurality of presentation options, each presentation option including two or more prioritized content items, wherein generating the plurality of presentation options includes:

predicting a predicted duration for each prioritized content item from the plurality of prioritized content items; and creating two or more presentation options, wherein each presentation option has an aggregate estimated time that is less than or equal to the window of time, the aggregate estimated time for a respective presentation option being a combined total of the predicted durations for each prioritized content item in the respective presentation option;

determining a selected presentation option from the plurality of presentation option, the selected presentation option having two or more presented content items; and presenting the presented content items corresponding to the selected presentation option to the user.

12. The system of claim 11, further comprising:

a storage device, wherein the sharing analysis application is configured to select the plurality of content items by storing the plurality of content items in the storage device.

13. The system of claim 11, wherein the method further comprises:

determining whether the predicted duration for a prioritized content item from the plurality of prioritized content items fits into the window of time; and excluding, in response to the predicted duration for the prioritized content item from the plurality of prioritized content items not fitting into the window of time, the prioritized content item from the two or more presentation options.

14. The system of claim 13, further comprising:

summarizing, in response to the predicted duration for the prioritized content item from the plurality of prioritized content items not fitting into the window of time, the prioritized content item from the plurality of prioritized content item.

15. The system of claim 14, wherein the summarizing the prioritized content item includes:
- determining, using the predicted duration for the prioritized content item and the window of time, a degree of summarization needed to lower the predicted duration to an amount of time that is less than the window of time; and
- summarizing the prioritized content according to the degree of summarization so that the user can read the prioritized content within the window of time,
- wherein the predicted duration is determined using a content readability index for the prioritized content item and historical readability patterns of the user, the content readability index being a numerical score that indicates a level of readability of a content item, the historical readability patterns of the user being based on a content type of the prioritized content item.

16. A computer program product for selecting a content item from a plurality of content items to fit within a window of time comprising a computer readable storage device having a computer readable program stored therein, wherein the computer readable program, when executed on a computing device, causes the computing device to:
- receive the window of time and a user profile;
- identify a content preference and a presentation preference within the user profile;
- select the plurality of content items based on the content preference;
- prioritize the plurality of content items, based on the presentation preference, that results in a plurality of prioritized content items;
- determine, for each prioritized content item, a topic of the prioritized content item;
- group the plurality of prioritized content items according to at least respective topics of each prioritized content item;
- generate a plurality of presentation options, each presentation option including two or more prioritized content items, wherein generating the plurality of presentation options includes:
  - predicting a predicted duration for each prioritized content item from the plurality of prioritized content items; and
  - creating two or more presentation options, wherein each presentation option has an aggregate estimated time that is less than or equal to the window of time, the aggregate estimated time for a respective presentation option being a combined total of the predicted durations for each prioritized content item in the respective presentation option;
- determine a selected presentation option from the plurality of presentation option, the selected presentation option having two or more presented content items; and
- present the presented content items corresponding to the selected presentation option.

17. The computer program product of claim 16, wherein the window of time is determined from a calendar of a user.